Patented Apr. 1, 1924.

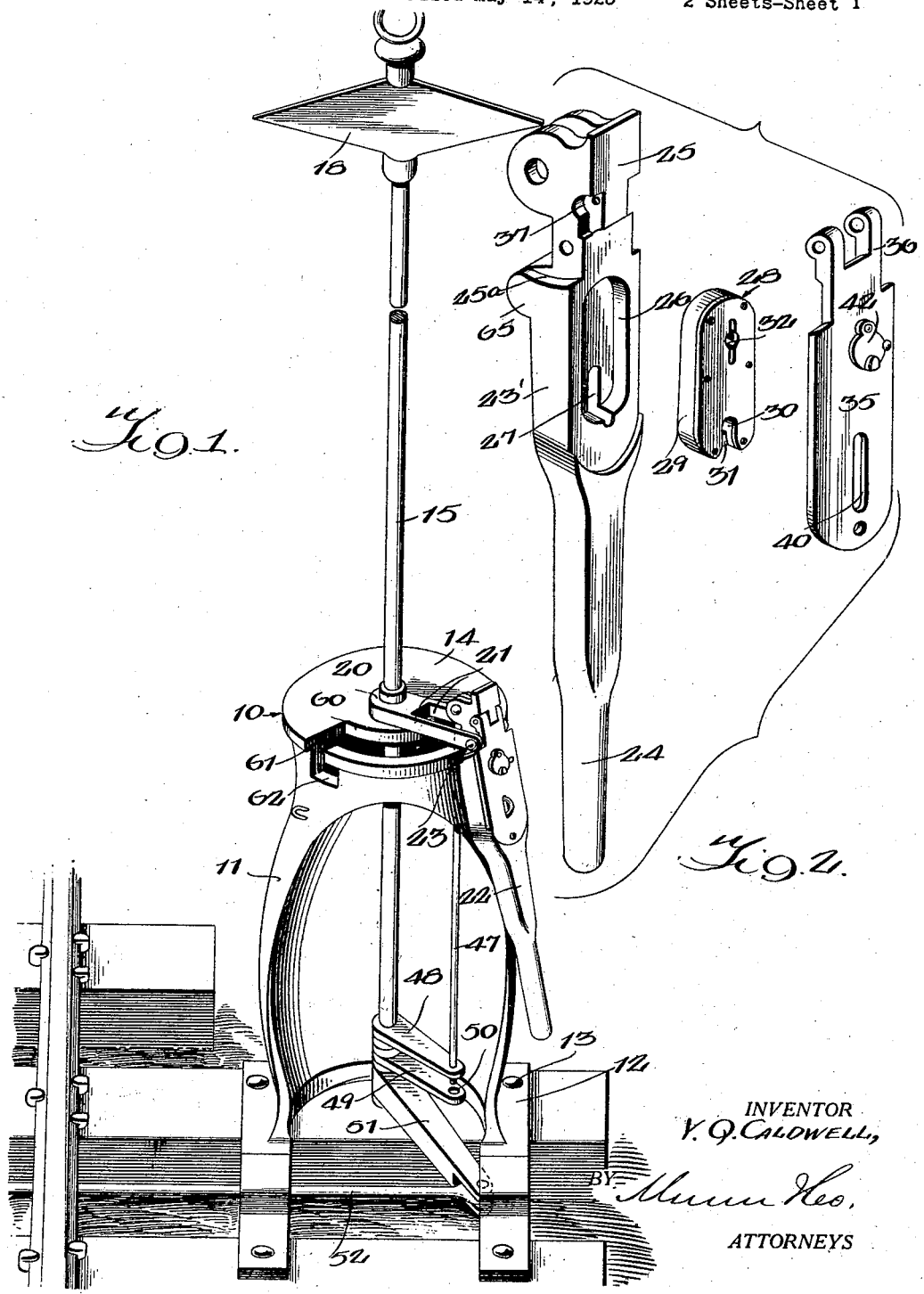

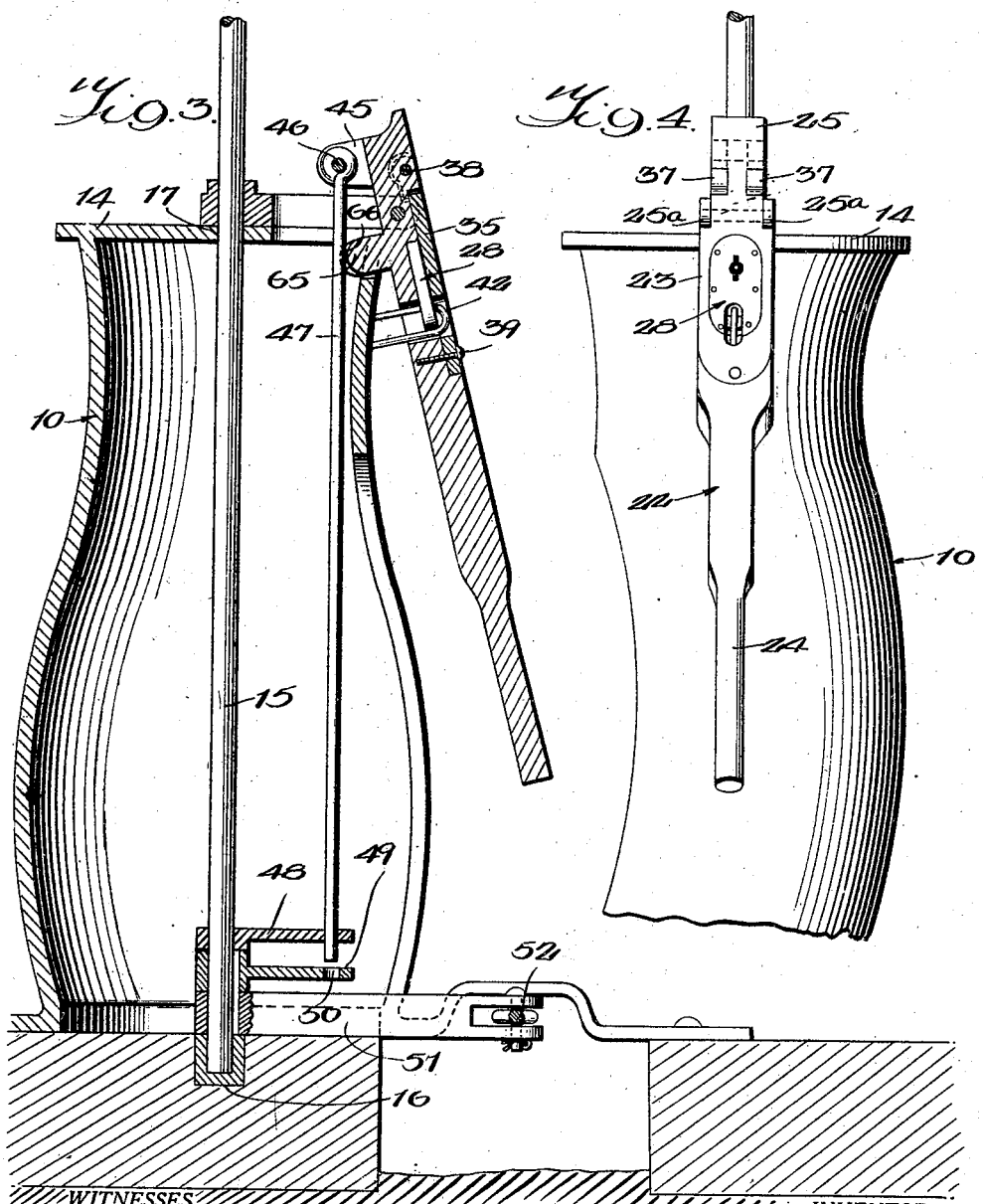

1,488,527

UNITED STATES PATENT OFFICE.

YANCEY QUITMAN CALDWELL, OF PARIS, TENNESSEE.

SWITCH STAND.

Application filed May 14, 1923. Serial No. 638,994.

*To all whom it may concern:*

Be it known that I, YANCEY QUITMAN CALDWELL, a citizen of the United States, and a resident of Paris, in the county of Henry and State of Tennessee, have invented certain new and useful Improvements in Switch Stands, of which the following is a specification.

This invention relates to an improvement in switch stands, and more particularly to an improvement in switch handles or switch levers adapted to be organized with switch stands.

The object of the invention is to provide an improved switch handle or switch lever which is of simple and durable construction, reliable and easy in operation and wherein the locking means although adapted for general use is embodied or incorporated in the structure of the switch handle in such a manner as to be protected from the weather and from manipulation by unauthorized persons and yet at the same time susceptible of operation by authorized persons while serving to securely hold the mechanism of the switch stand in adjusted position.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a perspective view, showing the preferred embodiment of the invention organized with the switch stand;

Figure 2 is a group view in perspective, showing the parts of the switch handle prior to assembly;

Figure 3 is a view, partly in vertical section and partly in elevation, showing the switch handle applied to the switch stand; and Figure 4 is a fragmentary view in elevation, showing the switch handle applied to the switch stand.

Referring to the drawings, the numeral 10 designates generally the switch stand which preferably comprises a shell like or hollow housing 11, a portion of which is broken away in order to more fully illustrate the invention. The lower end of this casing is provided with a base 12 suitably secured, as at 13 to the underlying ties and the upper ends of the housing is closed by a head 14. The vertical shaft 15 extends centrally of the casing and is mounted at its lower end on a spindle bearing 16 and is also journaled in a bearing 17 provided in the head 14. The shaft at its upper end carries a target or other signalling means 18.

A bracket or carrier 20 is loosely mounted on the shaft 15 above the head 14 and the outer end of the carrier is bifurcated to provide spaced arms 21 to which the switch handle or lever, designated generally at 22, is pivotally connected, as at 23.

The switch handle or lever which constitutes the present invention includes a body or stock 23', a handle portion 24 and a portion 25 by which the lever is pivotally mounted and by which it is operatively connected with the operating or actuating means for the switch. The handle portion 24 tapers toward its outer end whereby it may be more conveniently grasped and the portion 25 is reduced in width as clearly shown in Figure 2 in order to better adapt it to its purposes as will presently appear. In the body portion or stock 23 a chamber 26 is provided and opens to the outer or upper face of the switch lever. A transverse slot 27 is provided in the body portion or stock 23 and communicates with the chamber 26 and extends through the underside of the body portion. Preferably this slot 27 which intersects the chamber is disposed centrally and toward the lower end thereof. In the chamber 26 a lock designated generally at 28 is fitted. This lock 28 includes a casing 29 having an opening 30 adapted to coincide or register with the slot 27. The lock also includes an arcuate bolt 31 adapted to be extended or projected across the opening 30 and also across the slot 27. Key operated means, designated generally at 32 is provided for controlling the bolt 31. This lock 28 is complete in itself and is adapted for general use and preferably is the precise lock or the type of lock described and shown in my pending application filed March 14, 1923, Serial No. 625,112. The lock 28 is enclosed and protected in the cavity or chamber 26 by means of a cover plate 35 having pivot ears 36 at its upper end adapted to be fitted in the recesses 37 provided therefor in the portion 25 of the switch lever and to be pivotally secured to such portion by means of a pivot pin 38 extending through the alined openings of the ears and in an opening provided in the section of the portion 25 comprehended between the recesses 37. The lower end of the cover plate 35 is secured in any suitable manner to the stock or body portion 23 of the handle and preferably is so secured by means of a bolt or screw 39 having threaded connection with the cover plate and the bore provided in the stock or body. In the lower portion of the cover plate 39 a slot 40 is provided and in the assembly registers with the opening 30 of the lock and the slot 37 of the stock or body portion of the handle and through these alined slots and openings 27, 30 and 40 staples 42 of the switch stand are adapted to extend in certain positions of the handle as will be hereinafter more fully described. The cover plate 35 is also provided with a key opening alined with the key operated means of the lock and provided with a suitable closure 42.

As described the handle 22 is pivotally supported on the bracket or carrier 20 and this pivotal support is located adjacent the shoulders 25a provided at the juncture between the portion 25 and the body portion 23. At the outer end of the portion 25 and on the underside thereof a pair of spaced and apertured pivot ears 45 are provided and are pivotally connected, as at 46, to one end of a vertical reciprocal rod 47, the lower end of which is slidably fitted through an opening provided therefor in the guide arm 48 loosely mounted on the shaft 15 and overlying the crank arm 49 keyed to the shaft 15 and having an aperture 50 through which the rod 47 may be projected to connect the switch handle or lever to the shaft 15. The shaft 15 serves to control or throw the switch points through an operating arm 51 and other suitable mechanism designated at 52 and forming no part of the present invention, such means being well known to those skilled in the art. The head 14 of the switch stand is provided with an arcuate slot 60 which accommodates the rod 47 and the ears 45 during their operative movements and in order to more firmly and rigidly secure the switch ends in either of their positions the head 14 is provided with two radial slots 61 communicating with the arcuate slots 60 and with notches 62 provided in the switch stand. The slot 61 and notches 62 accommodates a locking lug 65 integrally formed or rigidly secured to the under side of the body portion 23' of the switch handle and adapted to be projected into one of the notches 62 when the switch handle is locked in either of its two positions, the lug 65 engaging the walls of the notches and slots to relieve the staples of strain and to more firmly and rigidly secure the switch handle in position. The inner end of the lug 65 is grooved, as at 66, to accommodate the rod 47.

In operation the handle may be released from either of its positions by inserting a key through the closure covered key hole 42 of the cover plate and using the key to actuate the key operated means of the lock 28 and thus to withdraw the arcuate bolt in the casing 29. The handle 22 may then be raised vertically and this movement of the handle projects the rod 47 into the opening 50 of the crank arm 49, the opening 50 being of sufficient size and so disposed as to receive the rod 47. This elevation of the switch handle also raises the lug 65 out of the notch 62 and slot 61 so that when raised the handle may be turned in a horizontal plane and about the shaft 15 as an axis. This turning movement of the handle is transmitted through the arm 47 and 49 to the shaft 15 and serves to suitably actuate the switch points and also the signal or target 18. When the switch points and target have been set as desired the handle 22 is again depressed to bring the lug 65 into the underlying notch 62 and slot 61 and to bring the staple 42 into the alined slots and openings 27, 30 and 40. Thus when the bolt of the lock is projected it will pass through the staple and lock the handle against movement.

An important feature of the invention resides in the provision of the switch handle in which is embedded an improved locking mechanism which is capable of use for many purposes and which at the same time when associated with the switch handle is housed and protected from weather and is also protected against tampering or manipulation by an unauthorized person. This locking mechanism and its organization with the switch handle combines the simplicity of the ordinary pad lock with the advantageous features of more complicated and expensive structures. At the same time the lock and other parts of the switch handle may be readily taken apart for purposes of replacement and repair.

While I have herein shown and described the preferred form of my invention, it is to be understood that I do not limit myself to the precise showing herein set forth as various changes in the form, proportion and minor details of construction may be made without departing from the spirit of the invention and the spirit and scope of the appended claims.

I claim:

1. A handle for use with switch stands, said handle having a cavity therein and having a transverse opening extending therethrough and intersecting the cavity, a key operated lock including a casing fitted in the cavity, said casing having a key hole slot and having an opening registering with the opening of the handle, said lock having its operating parts housed within its casing and having a bolt contained within the casing and adapted to be projected from the casing across the opening thereof and a combined cover and retaining plate secured to the handle and overlying the lock, said plate having a key hole slot therein registering with the key hole slot in the lock of the casing and also having a second slot registering with the opening of the lock casing.

2. A switch stand having its upper ends slotted and notched and provided with spaced staples, a vertical shaft extending through the switch stand, a switch handle mounted upon and connected to the vertical shaft, said switch handle including a stock and body portion, a handle portion and a connecting portion pivotally supported on the switch stand and vertical shaft and to be connected to the vertical shaft in its horizontal position, said handle having a lug adapted to be received in either of said notches or slots when in set position, said handle having a chamber formed therein and being provided with a slot intersecting said chamber, a lock fitted in the chamber and having an opening registering with the slot or handle, said lock having a bolt adapted to be projected across said opening and a cover plate secured to the handle and overlying the lock, the switch stand being provided with staples adapted to be received in the slot and opening in the handle and lock respectively.

YANCEY QUITMAN CALDWELL.